(12) United States Patent
Koons et al.

(10) Patent No.: US 9,073,529 B2
(45) Date of Patent: Jul. 7, 2015

(54) BRAKING CALIBRATION FOR VEHICLES

(75) Inventors: Douglas R. Koons, Brighton, MI (US); Patrick J. Monsere, Highland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 695 days.

(21) Appl. No.: 13/196,786

(22) Filed: Aug. 2, 2011

(65) Prior Publication Data

US 2013/0032438 A1 Feb. 7, 2013

(51) Int. Cl.
*B60T 13/66* (2006.01)
*B60T 8/40* (2006.01)
*B60T 17/22* (2006.01)

(52) U.S. Cl.
CPC ............. *B60T 13/662* (2013.01); *B60T 8/4054* (2013.01); *B60T 17/221* (2013.01)

(58) Field of Classification Search
USPC ........ 303/121, 3, 10, 167, 11, 15, 122, 122.1, 303/122.08, 122.09, 122.01
See application file for complete search history.

(56) References Cited

U.S. PATENT DOCUMENTS

2008/0231108 A1* 9/2008 Attallah et al. .................. 303/3

FOREIGN PATENT DOCUMENTS

JP 2000190841 A * 7/2000

OTHER PUBLICATIONS

Partial Translation JP 2000-190841A (Paragraphs 41-48).*

* cited by examiner

*Primary Examiner* — Melanie Torres Williams
(74) *Attorney, Agent, or Firm* — Ingrassia Fisher & Lorenz, P.C.

(57) ABSTRACT

Methods, systems, and vehicles are provided for calibrating a braking system of a vehicle. The braking system has an electric motor, a pump, and a hydraulic accumulator. A speed of the vehicle is obtained, and a pressure within the hydraulic accumulator is measured. The pump is operated via an electric motor to provide hydraulic pressure to the hydraulic accumulator based on the speed of the vehicle and the measure of pressure of the hydraulic accumulator.

17 Claims, 3 Drawing Sheets

BRAKING CALIBRATION FOR VEHICLES

TECHNICAL FIELD

The present disclosure generally relates to the field of vehicles and, more specifically, to methods and systems for calibrating braking systems for vehicles.

BACKGROUND

Automobiles and various other vehicles include braking systems for reducing vehicle speed or bringing the vehicle to a stop. Such braking systems generally include a controller that regulates the delivery of braking pressure to braking calipers on one or both axles of the vehicle to produce braking torque for the vehicle. For example, in an electro-hydraulic braking system, an electric motor causes a pump to provide an accumulation of hydraulic pressure that is ultimately provided to the braking calipers during braking. However, the accumulation of the hydraulic pressure can cause undesirable noise and vibration under certain conditions.

Accordingly, it is desirable to provide improved methods for calibrating braking systems of vehicles, for example that can help to reduce or mitigate noise and/or vibration associated with the accumulation of hydraulic pressure for the braking system. It is also desirable to provide systems and vehicles that provide such improved calibrating of braking systems. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for calibrating a braking system of a vehicle, the braking system having an electric motor, a pump, and a hydraulic accumulator. The method comprises the steps of obtaining a speed of the vehicle, obtaining a measure of pressure within the hydraulic accumulator, and operating the pump via the electric motor to provide hydraulic pressure to the hydraulic accumulator based on the speed and the measure of pressure.

In accordance with another exemplary embodiment, a system is provided for calibrating a braking unit of a vehicle, the braking unit having an electric motor, a pump, and a hydraulic accumulator, the vehicle also having a wheel. The system comprises a first sensor, a second sensor, and a processor. The first sensor is configured to measure a speed of the wheel. The second sensor is configured to measure a pressure of the hydraulic accumulator. The processor is coupled to the first sensor and the second sensor. The processor is configured to calculate a speed of the vehicle using the speed of the wheel, and operate the pump via the electric motor to provide hydraulic pressure to the hydraulic accumulator based on the speed of the vehicle and the measured pressure.

In accordance with a further exemplary embodiment, a vehicle is provided. The vehicle comprises a drive system and a braking system. The braking system is coupled to the drive system, and comprises braking units; a hydraulic accumulator, a pump, an electric motor, and a controller. The hydraulic accumulator is configured to provide hydraulic pressure to the braking units. The pump is configured to provide the hydraulic pressure to the hydraulic accumulator. The electric motor is coupled to the pump. The controller is coupled to the electric motor. The controller is configured to operate the pump via the electric motor to provide the hydraulic pressure to the hydraulic accumulator based on a speed of the vehicle and a measured pressure of the hydraulic accumulator.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
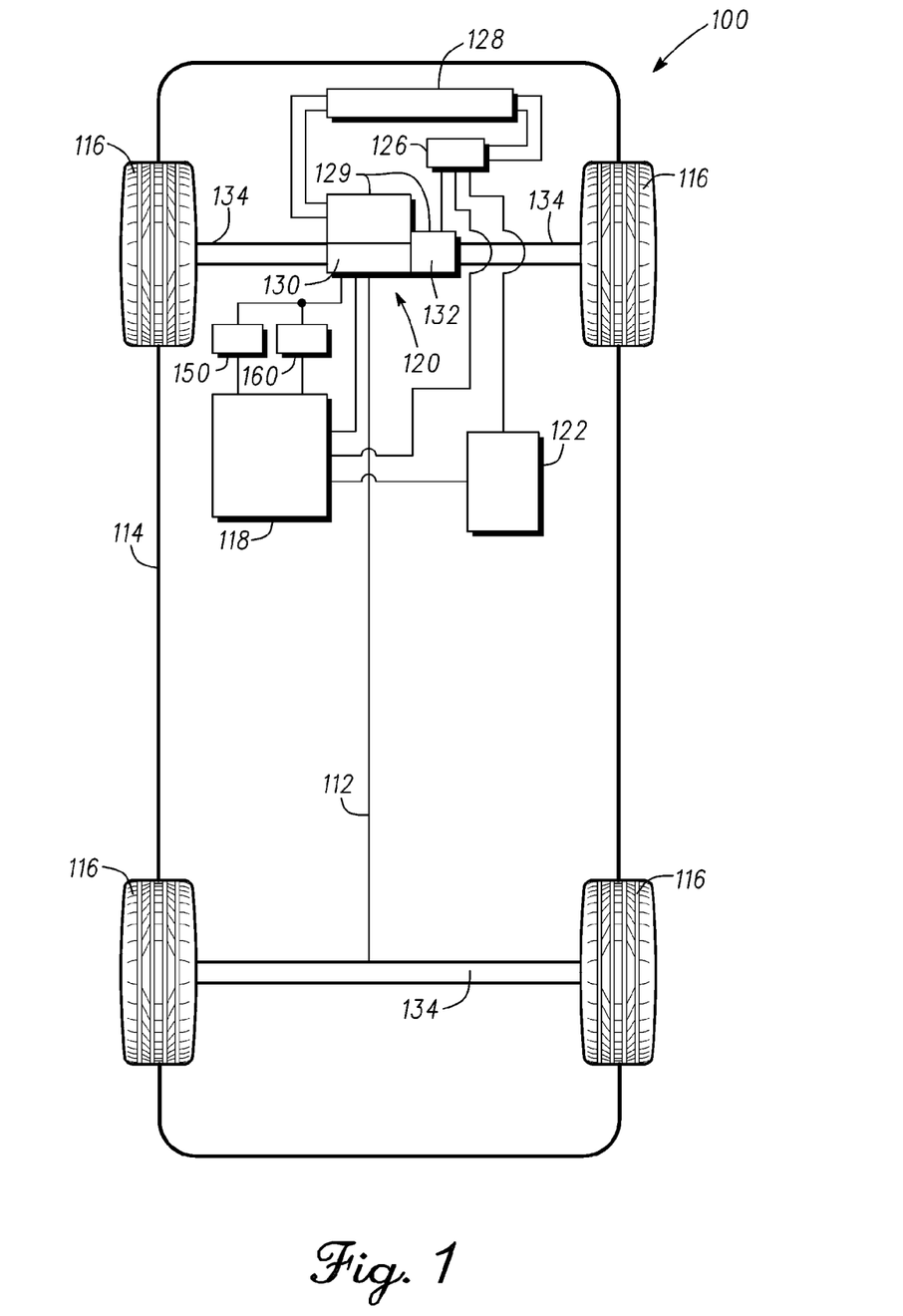
FIG. 1 is a functional block diagram of a vehicle that includes a braking system that is calibrated based on a speed of the vehicle and a pressure of the braking system, in accordance with an exemplary embodiment.

FIG. 1 illustrates a vehicle 100, or automobile, according to an exemplary embodiment. As described in greater detail further below, the vehicle 100 includes a braking system 160 that is calibrated based on a vehicle speed, and that can reduce vibration and noise within the vehicle.

As depicted in FIG. 1, the vehicle 100 includes a chassis 112, a body 114, four wheels 116, an electronic control system 118, a steering system 150, and the above-referenced braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114.

The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of electrical propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In the exemplary embodiment illustrated in FIG. 1, the vehicle 100 is a hybrid electric vehicle (HEV), and further includes an actuator assembly 120, an energy storage system (ESS) 122, a power inverter assembly (or inverter) 126, and a radiator 128. The actuator assembly 120 includes cooperating propulsion systems 129 (including a combustion engine 130 and an electric motor/generator 132) mounted on the chassis 112 that drives the wheels 116. As will be appreciated by one skilled in the art, the electric motor 132 includes a transmission therein, and, although not illustrated, also includes a stator assembly (including conductive coils), a rotor assembly (including a ferromagnetic core), and a cooling fluid or coolant. The stator assembly and/or the rotor assembly within the electric motor 132 may include multiple electromagnetic poles, as is commonly understood.

Still referring to FIG. 1, the combustion engine 130 and the electric motor 132 are integrated such that one or both are mechanically coupled to at least some of the wheels 116 through one or more drive shafts 134. In one embodiment, the vehicle 100 is a "series HEV," in which the combustion engine 130 is not directly coupled to the transmission, but coupled to a generator (not shown), which is used to power the electric motor 132. In another embodiment, the vehicle 100 is a "parallel HEV," in which the combustion engine 130 is directly coupled to the transmission by, for example, having the rotor of the electric motor 132 rotationally coupled to the drive shaft of the combustion engine 130.

The ESS 122 is mounted on the chassis 112, and is electrically connected to the inverter 126. The ESS 122 preferably comprises a battery having a pack of battery cells. In one embodiment, the ESS 122 comprises a lithium iron phosphate battery, such as a nanophosphate lithium ion battery. Together the ESS 122 and propulsion system(s) 129 provide a drive system to propel the vehicle 100.

The radiator 128 is connected to the frame at an outer portion thereof and although not illustrated in detail, includes multiple cooling channels therein that contain a cooling fluid (i.e., coolant) such as water and/or ethylene glycol (i.e., "antifreeze") and is coupled to the engine 130 and the inverter 126.

The steering system 150 is mounted on the chassis 112, and controls steering of the wheels 116. The steering system 150 includes a steering wheel and a steering column (not depicted). The steering wheel receives inputs from a driver of the vehicle. The steering column results in desired steering angles for the wheels 116 via the drive shafts 134 based on the inputs from the driver.

The braking system 160 provides braking for the vehicle 100. In a preferred embodiment, the braking system 160 is an electro-hydraulic braking system that is mounted, at least in part, on the chassis 112. As described more fully below, the braking system 160 is calibrated based on a speed of the vehicle 100 in order to reduce noise and/or vibrations within the vehicle 100. Specifically, FIG. 2 depicts a functional block diagram of the braking system 160, and FIG. 3 depicts a flowchart of a process for calibrating the braking system 160, in accordance with exemplary embodiments.

Figure 2:
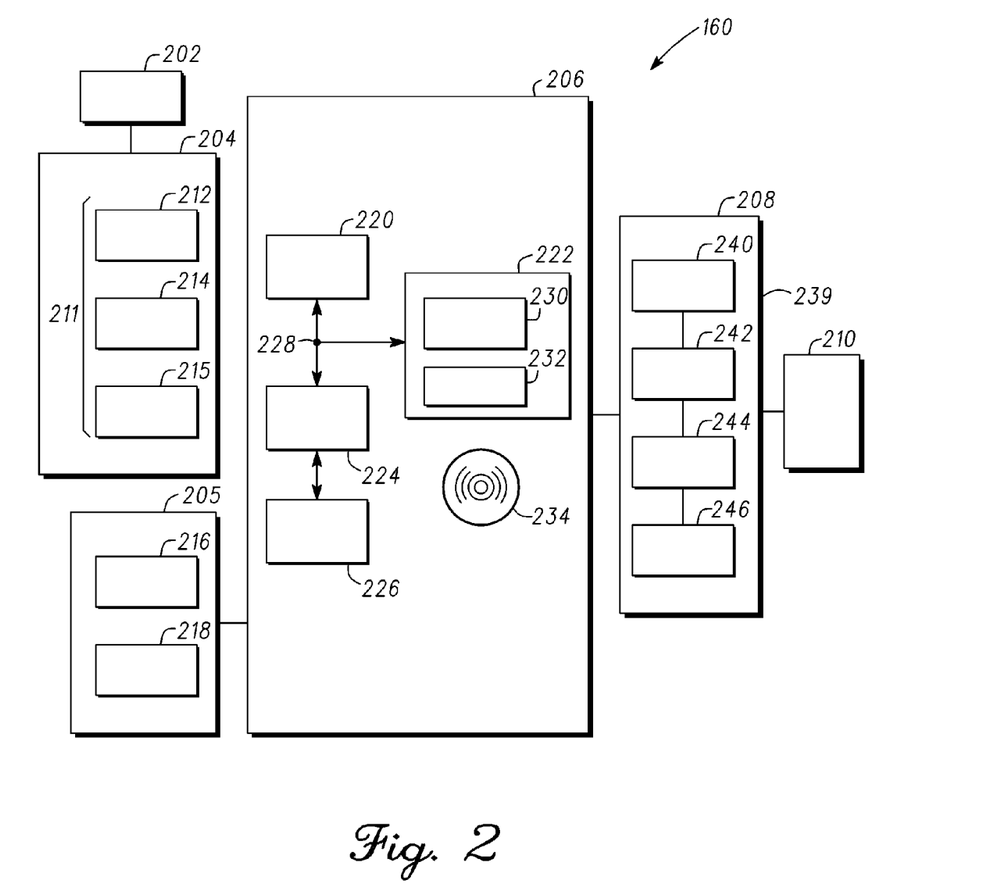
FIG. 2 is a functional block diagram of the braking system of FIG. 1, in accordance with an exemplary embodiment.
Figure 3:
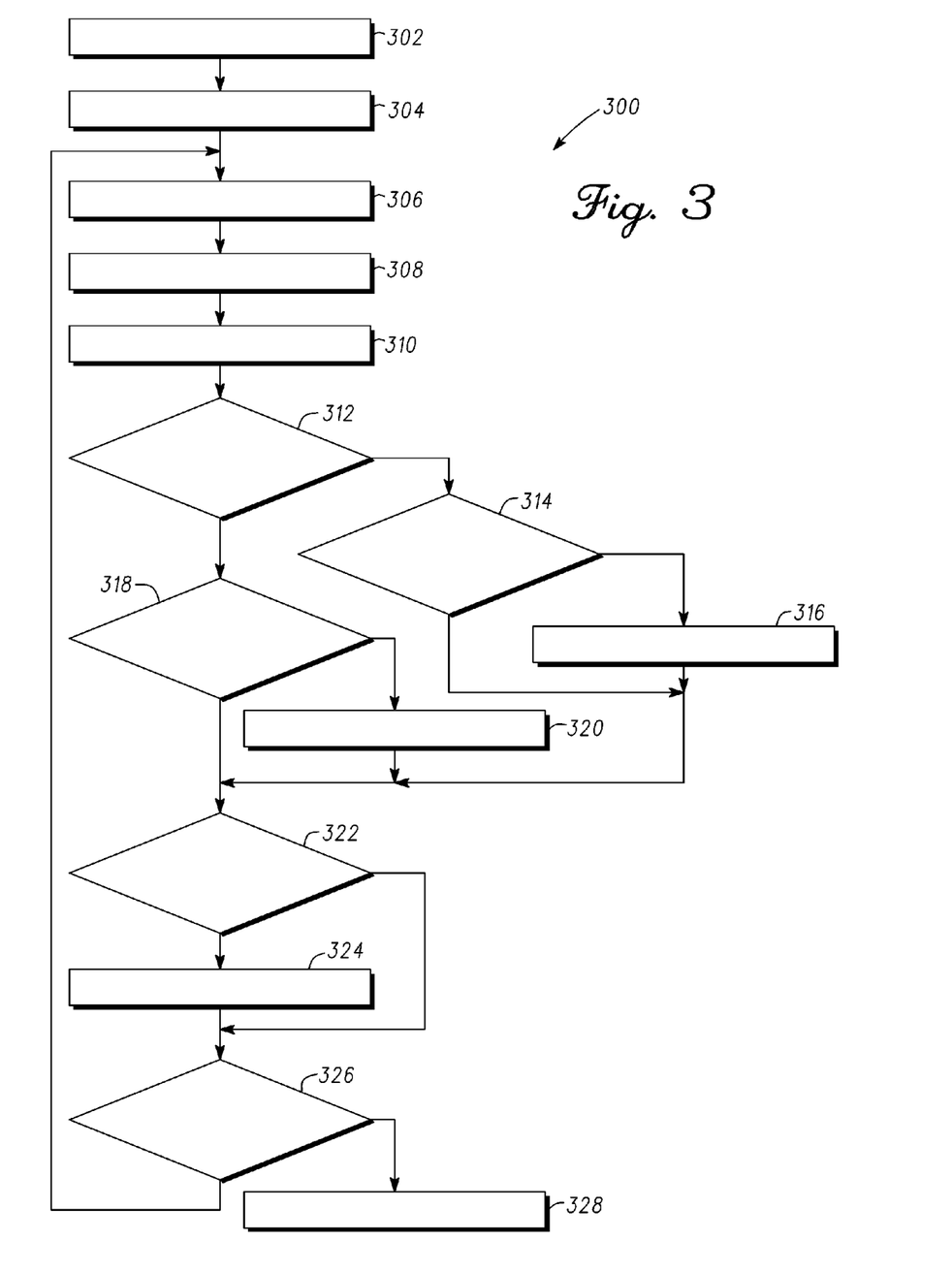
FIG. 3 is a flowchart of a process for calibrating a braking system of a vehicle, such as the braking system of FIGS. 1 and 2 and the vehicle of FIG. 1, in accordance with an exemplary embodiment.

With reference to FIG. 2, in the depicted embodiment the braking system 160 includes a brake pedal 202, a sensor array 204, a communication unit 205, a controller 206, a braking implementation sub-system 208, and one or more braking units 210.

The brake pedal 202 provides an interface between an operator of the vehicle 100 and the braking system 160 by which the operator may initiate braking and thereby slow or stop the vehicle 100. To initiate braking, an operator would typically use his or her foot to apply a force to the brake pedal 202 to move the brake pedal 202 in a generally downward direction.

The sensor array 204 measures or obtains information pertaining to the vehicle 100, including information pertaining to a speed of the vehicle, speeds of one or more wheels of the vehicle, and/or a hydraulic pressure associated with the braking implementation sub-system (specifically, a hydraulic pressure within a hydraulic accumulator 244 thereof, described further below). The sensor array 204 provides such information to the controller 206 for processing and for use in calibrating the braking system 160, and specifically the braking implementation sub-system 208 thereof. In certain embodiments, some or all of this information is provided by the communication unit 205 described below, instead of or in addition to the sensor array 204.

In the depicted embodiment, the sensor array 204 includes multiple sensors 211, including one or more brake pedal sensors 212, one or more wheel speed sensors 214, and one or more pressure sensors 215. The sensor array 204 may also include one or more other sensors, such as an ignition sensor (not depicted). The brake pedal sensors 212 are coupled to the brake pedal 202, and provide an indication as to a driver's engagement of the brake pedal 202 for use by the controller 206. The brake pedal sensors 212 preferably include one or more brake pedal position sensors and/or brake pedal travel sensors. The brake pedal position sensor measures a position of the brake pedal 202 or an indication as to how far the brake pedal has traveled when the operator applies force to the brake pedal. The brake pedal force sensor measures an amount of force applied to the brake pedal by the driver of the vehicle. The brake pedal sensor(s) provide 212 such brake pedal travel and/or brake pedal force values to the controller 206 for use by the controller 206 in calibrating the braking implementation sub-system 208.

The wheel speed sensors 214 are coupled to one or more of the wheels 116 of FIG. 1. The wheel speed sensors 214 measure wheel speeds of the wheels 116 while the vehicle is being operated. In one embodiment, each wheel speed sensor 214 measures a speed (or velocity) of a different respective wheel 116. The wheel speed sensors 214 provide the wheel speeds (or information pertaining thereto) to the controller 206 for use by the controller 206 in calibrating the braking implementation sub-system 208.

The pressure sensors 215 are coupled to the braking implementation sub-system 208, preferably to the hydraulic accumulator 244 (described further below) thereof. The pressure sensors 215 measure a hydraulic pressure of braking fluid within the hydraulic accumulator 244. As used throughout this Application, the term hydraulic pressure shall refer to a hydraulic pressure of the braking fluid. The pressure sensors 215 provide the pressure values (or information pertaining thereto) to the controller 206 for use by the controller 206 in calibrating the braking implementation sub-system 208.

The communication unit 205 receives information from one or more other systems or devices. In one embodiment, the communication unit 205 receives information pertaining to a speed of the vehicle, speeds of one or more wheels of the vehicle, and/or a pressure associated with the braking implementation sub-system (specifically, a hydraulic pressure of the hydraulic accumulator 244 thereof). The communication unit 205 provides such information to the controller 206 for processing and for use in calibrating the braking system 160, and specifically the braking implementation sub-system 208 thereof. In the depicted embodiment, the communication unit 205 includes an internal communication device 216 and an external communication device 218. The internal communication device 216 preferably comprises a transceiver configured to receive various of the above information from various other devices and systems of the vehicle via a vehicle communications bus (not depicted). The external communication device 218 preferably comprises a transceiver (such as a vehicle telematics unit and/or a global system (GPS) device) configured to receive various of the above information from a central database and/or from a satellite system via a wireless network (not depicted). In certain embodiments, some or all of this information is provided by the sensor array 204 described above, instead of or in addition to the communication unit 205.

The controller 206 is coupled to the sensor array 204, the communication unit 205, and the braking implementation sub-system 208. The controller 206 processes the data and information received from the sensor array 204 and/or the communication unit 205. The controller 206 calibrates the braking implementation sub-system 208 based on the speed of the vehicle and the hydraulic pressure of the braking system 160 (preferably, the hydraulic pressure of the hydraulic accumulator 244 of the braking implementation sub-system 208 described below). Specifically, the controller 206 provides instructions to an electric motor 240 of the braking implementation sub-system 208 to selectively operate a pump 242 of the braking implementation sub-system 208, to thereby control the hydraulic pressure, based on the vehicle speed and the pressure values (which are in turn calculated or determined based on the data and information obtained from the sensor array 204 and/or the communication unit 205). In a preferred embodiment, the controller 206 performs these functions in accordance with steps of the process described below in connection with FIG. 3.

As depicted in FIG. 2, the controller 206 comprises a computer system. In certain embodiments, the controller 206 may also include one or more of the sensor array 204, the communication unit 205, and/or components thereof. In addition, it will be appreciated that the controller 206 may otherwise differ from the embodiment depicted in FIG. 2. For example, the controller 206 may be coupled to or may otherwise utilize one or more remote computer systems and/or other control systems.

In the depicted embodiment, the computer system of the controller 206 includes a processor 220, a memory 222, an interface 224, a storage device 226, and a bus 228. The processor 220 performs the computation and control functions of the controller 206, and may comprise any type of processor or multiple processors, single integrated circuits such as a microprocessor, or any suitable number of integrated circuit devices and/or circuit boards working in cooperation to accomplish the functions of a processing unit. During operation, the processor 220 executes one or more programs 230 contained within the memory 222 and, as such, controls the general operation of the controller 206 and the computer system of the controller 206, preferably in executing the steps of the processes described herein, such as the steps of the process 300 in connection with FIG. 3.

The memory 222 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 222 is located on and/or co-located on the same computer chip as the processor 220. In the depicted embodiment, the memory 222 stores the above-referenced program 230 along with one or more stored values 232 for use in calibrating the braking system.

The bus 228 serves to transmit programs, data, status and other information or signals between the various components of the computer system of the controller 206. The interface 224 allows communication to the computer system of the controller 206, for example from a system driver and/or another computer system, and can be implemented using any suitable method and apparatus. It can include one or more network interfaces to communicate with other systems or components. The interface 224 may also include one or more network interfaces to communicate with technicians, and/or one or more storage interfaces to connect to storage apparatuses, such as the storage device 226.

The storage device 226 can be any suitable type of storage apparatus, including direct access storage devices such as hard disk drives, flash systems, floppy disk drives and optical disk drives. In one exemplary embodiment, the storage device 226 comprises a program product from which memory 222 can receive a program 230 that executes one or more embodiments of one or more processes of the present disclosure, such as the steps of the process 300 of FIG. 3, described further below. In another exemplary embodiment, the program product may be directly stored in and/or otherwise accessed by the memory 222 and/or a disk (e.g., disk 234), such as that referenced below.

The bus 228 can be any suitable physical or logical means of connecting computer systems and components. This includes, but is not limited to, direct hard-wired connections, fiber optics, infrared and wireless bus technologies. During operation, the program 230 is stored in the memory 222 and executed by the processor 220.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 220) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 206 may also otherwise differ from the embodiment depicted in FIG. 2, for example in that the computer system of the controller 206 may be coupled to or may otherwise utilize one or more remote computer systems and/or other control systems.

The braking implementation sub-system 208 is coupled between the controller 206 and the braking units 210. The braking implementation sub-system 208 is calibrated by the controller 206 (preferably, by the processor 220 thereof). Specifically, the braking implementation sub-system 208 provides hydraulic pressure to the braking units 210 in accordance with instructions provided by the processor 220 based on the vehicle speed and the current, measured levels of hydraulic pressure in the braking implementation sub-system 208.

As depicted in FIG. 2, the braking implementation sub-system 208 includes the above-referenced electric motor 240, pump 242, and hydraulic accumulator 244, along with a valve 246. The electric motor 240 is coupled between the processor 220 and the pump 242. The electric motor 240 operates (and is turned off and on) based on instructions provided by the processor 220. The electric motor 240 in turn drives the operation of the pump 242 based on these instructions. As the pump 242 operates, the pump 242 provides hydraulic pressure for the hydraulic accumulator 244. Subsequently, when a braking event occurs (for example, when the driver engages the brake pedal 202), hydraulic pressure from the accumulator is delivered to the braking units 210 via the valve 246 based on instructions provided by the processor 220.

In a preferred embodiment, the electric motor 240, the pump 242, the hydraulic accumulator 244, and the valve 246 are each disposed within a common housing 239 of the braking implementation sub-system 208. Also in a preferred embodiment, the controller 206 is disposed adjacent to and against the housing 239. The valve 246 preferably comprises a solenoid valve.

The braking units 210 are coupled to the braking implementation sub-system 208. The braking units 210 receive hydraulic pressure from the braking implementation sub-system 208 via the valve 246 thereof. The hydraulic pressure causes the braking units 210 to produce braking torque for the vehicle 100. In one embodiment, the braking units 210 comprise one or more braking calipers that are disposed on one or more axles of the vehicle (such as one or more of the drive shafts 134 of FIG. 1) to produce braking torque for the vehicle. In addition, in one embodiment, the hydraulic pressure causes the brake calipers to be applied to a brake disk (which may also be part of the braking units 210) to induce friction to stop the vehicle 100.

FIG. 3 is a flowchart of a process 300 for calibrating a braking system for a vehicle, in accordance with an exemplary embodiment. The process 300 can be used in connection with the vehicle 100 of FIG. 1 and the braking system 160 of FIGS. 1 and 2. The process 300 is preferably performed continuously during a current drive cycle (also referred to herein as an ignition cycle) of the vehicle.

The process begins when an ignition of a vehicle (such as the vehicle 100 of FIG. 1) is turned on (step 302). Once the ignition is turned on, hydraulic pressure is built up for a braking system (such as the braking system 160 of FIGS. 1 and 2) of the vehicle (step 304). Specifically, during step 304, a processor provides instructions for operation of an electric motor, and runs a pump via the electric motor to thereby provide hydraulic pressure for an accumulator of the braking system until the hydraulic pressure reaches a predetermined threshold (step 304). In a preferred embodiment, during step 304, the processor 220 of FIG. 2 provides instructions for operation of the electric motor 240 of FIG. 2, and runs the pump 242 of FIG. 2 via the electric motor 240 to thereby provide hydraulic pressure for the hydraulic accumulator 244 of FIG. 2 until the hydraulic pressure reaches a predetermined threshold, or until a predetermined amount of time has elapsed. Also in a preferred embodiment, the predetermined threshold of step 304 is equal to a maximum hydraulic pressure capacity of the hydraulic accumulator 244, and is most preferably equal to 180 bar of pressure. The predetermined threshold of step 304 is preferably stored in the memory 222 of FIG. 2 as one of the stored values 232 therein. In one preferred embodiment, during step 304, the accumulator is filled in this manner during the ignition event for approximately fifteen seconds, or until the hydraulic pressure for the hydraulic accumulator has increased from zero to approximately 180 bar of pressure.

A speed of the vehicle is determined (step 306). The vehicle speed is preferably determined by the processor 220 of FIG. 2 based on data provided by the sensor array 204 and/or the communication unit 205 of FIG. 2. In one embodiment, the vehicle speed is calculated by the processor 220 based on wheel speed data obtained from the wheel speed sensors 214 of FIG. 2. In other embodiments, the vehicle speed may be calculated by the processor 220 of FIG. 2 based on wheel speed, GPS, and/or other data obtained from the communication unit 205 of FIG. 2, and/or the vehicle speed may be obtained by the processor 220 of FIG. 2 from the communication unit 205 of FIG. 2 (for example, if the vehicle speed has already been calculated by another vehicle system). The vehicle speed is preferably determined throughout the ignition cycle, and most preferably continuously throughout the ignition cycle.

A pressure of a braking system is also determined (step 308). The pressure preferably comprises a hydraulic pressure of braking fluid of the braking implantation sub-system 208 of FIG. 2. Most preferably, the pressure comprises a current amount of hydraulic pressure of the braking fluid within the hydraulic accumulator 244 of FIG. 2. In one embodiment, the pressure is determined by the processor 220 of FIG. 2 based on hydraulic pressure measurements from the pressure sensors 215 of FIG. 1. In another embodiment, the pressure is determined by the processor 220 of FIG. 2 based on pressure measurements from the communication unit 205 of FIG. 2 (for example, if the hydraulic pressure vehicle speed has already been determined by another vehicle system). The pressure is preferably determined throughout the ignition cycle, and most preferably continuously throughout the ignition cycle.

In addition, braking inputs are determined (step 310). The braking inputs preferably include one or more measures of a driver's engagement of a brake pedal for the vehicle (such as the brake pedal 202 of FIG. 2). Specifically, the braking inputs preferably include measures of brake pedal travel (namely, movement of the brake pedal) and/or brake pedal force (namely, force applied to the brake pedal). In one embodiment, the braking inputs are determined by the processor 220 of FIG. 2 based on measurements from the brake pedal sensors 212 of FIG. 2. In another embodiment, the braking inputs are determined by the processor 220 of FIG. 2 based on braking data obtained from the communication unit 205 of FIG. 2 (for example, if such braking data has already been determined by another vehicle system). The braking inputs are preferably determined throughout the ignition cycle, and most preferably continuously throughout the ignition cycle.

A determination is made as to whether the vehicle speed of step 306 is less than a predetermined speed threshold (step 312). This determination is preferably made by the processor 220 of FIG. 2 throughout the ignition cycle, and most preferably continuously throughout the ignition cycle. In one preferred embodiment, the predetermined speed threshold is equal to approximately four meters per second (4 m/s) or approximately ten miles per hour (10 mph).

If it is determined in step 312 that the vehicle speed is less than the predetermined speed threshold, then the operation of the electric motor and the pump are calibrated and controlled by the processor based on a first predetermined pressure threshold (steps 314 and 316). Specifically, in step 314, a determination is made as to whether the measured hydraulic pressure of step 308 is less than the first predetermined threshold. This determination is preferably made by the processor 220 of FIG. 2.

In one embodiment, the first predetermined threshold of step 314 is equal to 120 bar of pressure, and is preferably stored in the memory 222 of FIG. 2 as one of the stored values 232 therein. If it is determined in step 314 that the measured hydraulic pressure of step 308 is greater than or equal to the first predetermined threshold, then the process proceeds to step 322, described further below.

If it is determined in step 314 that the measured hydraulic pressure of step 308 is less than the first predetermined threshold, then additional hydraulic pressure is provided for the accumulator (step 316). Specifically, in a preferred embodiment, the processor 220 of FIG. 2 provides instructions for operation of the electric motor 240 of FIG. 2, and runs the pump 242 of FIG. 2 via the electric motor 240 to thereby provide hydraulic pressure for the hydraulic accumulator 244 of FIG. 2. In one embodiment, the electric motor 240 and pump 242 are operated in this manner to provide hydraulic pressure to the hydraulic accumulator 244 until a measured hydraulic pressure of the hydraulic accumulator 244 reaches a third predetermined threshold. In another embodiment, the electric motor 240 and pump 242 are operated in this manner to provide hydraulic pressure for a first predetermined amount of time. The third predetermined threshold and/or the first predetermined amount of time are preferably stored in the memory 222 of FIG. 2 as one of the stored values 232 therein.

The first predetermined amount of time corresponds to an amount of time required to increase the hydraulic pressure in the hydraulic accumulator 244 from the amount of hydraulic pressure of the first predetermined threshold of step 314 to the amount of the third predetermined threshold of step 316. In one embodiment, the third predetermined threshold of step 316 is 20 bar greater than the first predetermined threshold of step 314. Also in a preferred embodiment, the third predetermined threshold of step 316 is equal to 140 bar. In addition, in a preferred embodiment, the first predetermined amount of time of step 316 is equal to approximately two seconds. Following step 316, the process proceeds to step 322, described further below.

Returning now to step 312, if it is determined that the vehicle speed is greater than or equal to the predetermined speed threshold, then the operation of the electric motor and the pump are calibrated and controlled by the processor based on a second predetermined pressure threshold (steps 318 and 320). Specifically, in step 318, a determination is made as to whether the measured hydraulic pressure of step 308 is less than the second predetermined threshold. This determination is preferably made by the processor 220 of FIG. 2.

The second predetermined threshold of step 318 is greater than the first predetermined threshold of step 314. In one embodiment, the second predetermined threshold of step 318 is equal to 140 bar of pressure. The second predetermined threshold is preferably stored in the memory 222 of FIG. 2 as one of the stored values 232 therein. If it is determined in step 318 that the measured hydraulic pressure of step 308 is greater than or equal to the second predetermined threshold, then the process proceeds to step 322, described further below.

If it is determined in step 318 that the measured hydraulic pressure of step 308 is less than the second predetermined threshold, then additional hydraulic pressure is provided for the accumulator (step 320). Specifically, in a preferred embodiment, the processor 220 of FIG. 2 provides instructions for operation of the electric motor 240 of FIG. 2, and runs the pump 242 of FIG. 2 via the electric motor 240 to thereby provide hydraulic pressure for the hydraulic accumulator 244 of FIG. 2. In one embodiment, the electric motor 240 and pump 242 are operated in this manner to provide hydraulic pressure to the hydraulic accumulator 244 until a measured hydraulic pressure of the hydraulic accumulator 244 reaches a fourth predetermined threshold. In another embodiment, the electric motor 240 and pump 242 are operated in this manner to provide hydraulic pressure for a second predetermined amount of time. The fourth predetermined threshold and/or the second predetermined amount of time are preferably stored in the memory 222 of FIG. 2 as one of the stored values 232 therein.

The second predetermined amount of time corresponds to an amount of time required to increase the hydraulic pressure in the hydraulic accumulator 244 from the amount of hydraulic pressure of the second predetermined threshold of step 318 to the amount of the fourth predetermined threshold of step 320. The fourth predetermined threshold of step 320 is preferably greater than the third predetermined threshold of step 316, and is preferably equal to the predetermined threshold (or maximum accumulator pressure capacity) of step 304. In one embodiment, the fourth predetermined threshold of step 320 is 40 bar greater than the second predetermined threshold of step 318. Also in a preferred embodiment, the fourth predetermined threshold is equal to 180 bar. In addition, in a preferred embodiment, the second predetermined amount of time of step 320 is equal to approximately four seconds. Following step 320, the process proceeds to step 322, described directly below.

During step 322, a determination is made as to whether a braking request has been made. In a preferred embodiment, during step 322, a determination is made as to whether a driver is engaging the brake pedal 202 of FIG. 2, based on the braking inputs obtained during step 310. If it is determined that a braking request has not been made, the process proceeds directly to step 326, described further below.

If it is determined that a braking request has been made, then braking is applied for the vehicle (step 324). Specifically, the processor 220 of FIG. 2 provides instructions for the hydraulic pressure of the hydraulic accumulator 244 of FIG. 2 to be delivered to the braking units 210 of FIG. 1 via the valve 246 of FIG. 2, and braking units 210 provide braking torque and friction for braking for the vehicle. The process then proceeds to step 326, described below.

Step 322 is preferably performed throughout the ignition cycle, and most preferably continuously throughout the ignition cycle, regardless of the determinations of steps 312, 314, and 318. Specifically, if a determination is made at any time that a brake request has been made, then braking is applied in step 324, regardless of any other steps that may be in process.

During step 326, a determination is made as to whether the vehicle ignition has been turned off. In a preferred embodiment, this determination is made by the processor 220 of FIG. 2 based on information obtained from the sensor array 204 of FIG. 2 and/or the communication unit 205 of FIG. 2, such as from an ignition sensor and/or an ignition control unit (not depicted). If it is determined in step 326 that the ignition has not been turned off, then the process returns to step 306, and steps 306-326 repeat until the ignition is turned off.

Once it is determined in an iteration of step 326 that the ignition has been turned off, then the hydraulic accumulator 244 of FIG. 2 is drained, preferably completely, of its hydraulic pressure (step 328). The hydraulic accumulator 244 is preferably drained based on instructions provided by the processor 220 of FIG. 2. The process then terminates until the ignition is turned back on again in step 302.

Step 326 is preferably performed throughout the ignition cycle, and most preferably continuously throughout the ignition cycle, regardless of the determinations of steps 312, 314, 318, and 322. Specifically, if a determination is made at any time that the vehicle ignition has been turned off, then the hydraulic accumulator 244 of FIG. 2 is drained, regardless of any other steps that may be in process.

Thus, the process 300 provides for calibration of a braking system for a vehicle based on the vehicle speed and a measured hydraulic pressure of the accumulator of the braking system. The accumulator is filled to capacity with hydraulic fluid when the ignition is first turned on (step 304), and is drained of hydraulic fluid when the ignition is turned off (step 328). In between these events, during the current ignition cycle of the vehicle, the accumulator is filled more quickly at relatively low vehicle speeds (steps 314, 316) as compared with relatively high vehicle speeds (steps 318, 320). Specifically, at relatively low vehicle speeds, the pump is turned on relatively sooner (namely, at a relatively lower predetermined threshold, and for a relatively smaller amount of time) (steps 314, 316) as compared the pump operation at relatively high vehicle speeds (steps 318, 320). As a result, a decrease in unwanted noise and/or vibration may be provided for the driver at relatively low speeds. Such a decrease in noise and/or vibration may be particularly important at relatively low speeds because (i) demand for hydraulic pressure for braking is generally relatively less in magnitude at relatively low speeds and (ii) any masking of the noise and/or vibration may otherwise be more difficult at relatively low speeds, as compared with relatively higher speeds.

Accordingly, methods, systems, and vehicles are provided for improved calibration of braking systems for vehicles. The disclosed methods, systems, and vehicles provide for controlled operation of an electric motor and pump of the braking system, and for controlled accumulation of hydraulic pressure for the braking system, based on the vehicle speed and a measured hydraulic pressure of a hydraulic accumulator of the braking system. As a result, the occupants of the vehicle may experience reduced noise and/or vibration from the braking system.

It will be appreciated that the disclosed methods, systems, and vehicles may vary from those depicted in the Figures and described herein. For example, the vehicle 100, the braking system 160, and/or various components thereof may vary from that depicted in FIGS. 1 and 2 and described in connection therewith. In addition, it will be appreciated that certain steps of the process 300 (and/or sub-processes or sub-steps thereof) may vary from those depicted in FIG. 3 and/or described above in connection therewith. It will similarly be appreciated that certain steps of the process 300 may occur simultaneously or in a different order than that depicted in FIG. 3 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

We claim:

1. A method for calibrating a braking system of a vehicle, the braking system having an electric motor, a pump, and a hydraulic accumulator, the method comprising:
   obtaining a speed of the vehicle;
   obtaining a measure of pressure of the hydraulic accumulator; and
   operating the pump via the electric motor to provide hydraulic pressure to the hydraulic accumulator based on the speed and the measure of pressure,
   wherein the step of operating the pump comprises running the pump if one of the following conditions is satisfied, namely:
      the measure of pressure is less than a first predetermined pressure threshold and the speed is less than a speed threshold; or
      the measure of pressure is less than a second predetermined pressure threshold and the speed is greater than the speed threshold, the second predetermined pressure threshold being greater than the first predetermined pressure threshold.

2. The method of claim 1, wherein the step of operating the pump comprises the steps of:
   running the pump for a first amount of time if the measure of pressure is less than the first predetermined pressure threshold and the speed is less than the speed threshold; and
   running the pump for a second amount of time if the measure of pressure is less than the second predetermined pressure threshold and the speed is greater than the speed threshold, the second amount of time being greater than the first amount of time.

3. The method of claim 1, wherein the step of operating the pump comprises the steps of:
   running the pump, if the measure of pressure is less than the first predetermined pressure threshold and the speed is less than the speed threshold, until the hydraulic pressure reaches a third predetermined pressure threshold; and
   running the pump, if the measure of pressure is less than the second predetermined pressure threshold and the speed is greater than the speed threshold, until the hydraulic pressure reaches a fourth predetermined pressure threshold, the fourth predetermined pressure threshold being greater than the third predetermined pressure threshold.

4. The method of claim 3, wherein the step of running the pump if the measure of pressure is less than the second predetermined pressure threshold and the speed is greater than the speed threshold comprises the step of:
   running the pump, if the measure of pressure is less than the second predetermined pressure threshold and the speed is greater than the speed threshold, until the hydraulic pressure reaches a fourth predetermined pressure threshold, the fourth predetermined pressure threshold being greater than the third predetermined pressure threshold, wherein the third predetermined pressure threshold is approximately 20 bar greater than the first predetermined pressure threshold.

5. The method of claim 3, wherein:
   the step of running the pump if the measure of pressure is less than the first predetermined pressure threshold comprises the step of running the pump, if the measure of pressure is less than the first predetermined pressure threshold and the speed is less than a speed threshold, until the hydraulic pressure reaches approximately 140 bar; and
   the step of running the pump if the measure of pressure is less than the second predetermined pressure threshold and the speed is greater than the speed threshold comprises the step of running the pump, if the measure of pressure is less than the second predetermined pressure threshold and the speed is greater than the speed threshold, until the hydraulic pressure reaches approximately 180 bar.

6. The method of claim 3, wherein the vehicle also includes an ignition, and the method further comprises the step of:
   running the pump until the hydraulic pressure reaches the fourth predetermined pressure threshold, regardless of the speed and the measure of pressure, when the ignition is first turned on during a drive cycle.

7. A system for calibrating a braking unit of a vehicle, the braking unit having an electric motor, a pump, and a hydraulic accumulator, the vehicle also having a wheel, the system comprising: a first sensor configured to measure a speed of the wheel; a second sensor configured to measure a pressure within the hydraulic accumulator; and a processor coupled to the first sensor and the second sensor and configured to: calculate a speed of the vehicle using the speed of the wheel; and operate the pump via the electric motor to provide hydraulic pressure to the hydraulic accumulator based on the speed of the vehicle and the measured pressure, wherein the processor is further configured to run the pump if one of the following conditions is satisfied, namely: the measured pressure is less than a first predetermined pressure threshold and the speed of the vehicle is less than a speed threshold; or the measured pressure is less than a second predetermined pressure threshold and the speed of the vehicle is greater than the speed threshold, the second predetermined pressure threshold being greater than the first predetermined pressure threshold.

8. The system of claim 7, wherein the processor is further configured to:
run the pump for a first amount of time if the measured pressure is less than the first predetermined pressure threshold and the speed of the vehicle is less than the speed threshold; and
run the pump for a second amount of time if the measured pressure is less than the second predetermined pressure threshold and the speed of the vehicle is greater than the speed threshold, the second amount of time being greater than the first amount of time.

9. The system of claim 7, wherein the processor is further configured to:
run the pump, if the measured pressure is less than the first predetermined pressure threshold and the speed of the vehicle is less than the speed threshold, until the hydraulic pressure reaches a third predetermined pressure threshold; and
run the pump, if the measured pressure is less than the second predetermined pressure threshold and the speed of the vehicle is greater than the speed threshold, until the hydraulic pressure reaches a fourth predetermined pressure threshold, the fourth predetermined pressure threshold being greater than the third predetermined pressure threshold.

10. The system of claim 9, wherein the third predetermined pressure threshold is approximately 20 bar greater than the first predetermined pressure threshold.

11. The system of claim 9, wherein:
the first predetermined pressure threshold is approximately equal to 120 bar of pressure; and
the third predetermined pressure threshold is approximately equal to 140 bar of pressure.

12. The system of claim 9, wherein the vehicle also includes an ignition, and the processor is further configured to:
run the pump until the hydraulic pressure reaches the fourth predetermined pressure threshold, regardless of the speed of the vehicle and the measured pressure, when the ignition is first turned on during a drive cycle.

13. A vehicle comprising: a drive system; and a braking system coupled to the drive system, the braking system comprising: braking units; a hydraulic accumulator configured to provide hydraulic pressure to the braking units; a pump configured to provide the hydraulic pressure to the hydraulic accumulator; an electric motor coupled to the pump; and a controller coupled to the electric motor and configured to operate the pump via the electric motor to provide the hydraulic pressure to the hydraulic accumulator based on a speed of the vehicle and a measured pressure within the hydraulic accumulator, wherein the controller is further configured to run the pump if one of the following conditions is satisfied, namely: the measured pressure is less than a first predetermined pressure threshold and the speed of the vehicle is less than a speed threshold; or the measured pressure is less than a second predetermined pressure threshold and the speed of the vehicle is greater than the speed threshold, the second predetermined pressure threshold being greater than the first predetermined pressure threshold.

14. The vehicle of claim 13, wherein the controller is further configured to:
run the pump for a first amount of time if the measured pressure is less than the first predetermined pressure threshold and the speed of the vehicle is less than the speed threshold; and
run the pump for a second amount of time if the measured pressure is less than the second predetermined pressure threshold and the speed of the vehicle is greater than the speed threshold, the second amount of time being greater than the first amount of time.

15. The vehicle of claim 13, wherein the controller is further configured to:
run the pump, if the measured pressure is less than the first predetermined pressure threshold and the speed of the vehicle is less than the speed threshold, until the hydraulic pressure reaches a third predetermined pressure threshold; and
run the pump, if the measured pressure is less than the second predetermined pressure threshold and the speed of the vehicle is greater than the speed threshold, until the hydraulic pressure reaches a fourth predetermined pressure threshold, the fourth predetermined pressure threshold being greater than the third predetermined pressure threshold.

16. The vehicle of claim 15, wherein:
the first predetermined pressure threshold is approximately equal to 120 bar of pressure; and
the third predetermined pressure threshold is approximately equal to 140 bar of pressure.

17. The vehicle of claim 15, wherein the vehicle also includes an ignition, and the controller is further configured to run the pump until the hydraulic pressure reaches the fourth predetermined pressure threshold, regardless of the speed of the vehicle and the measured pressure, when the ignition is first turned on during a drive cycle.

* * * * *